Figure 1:
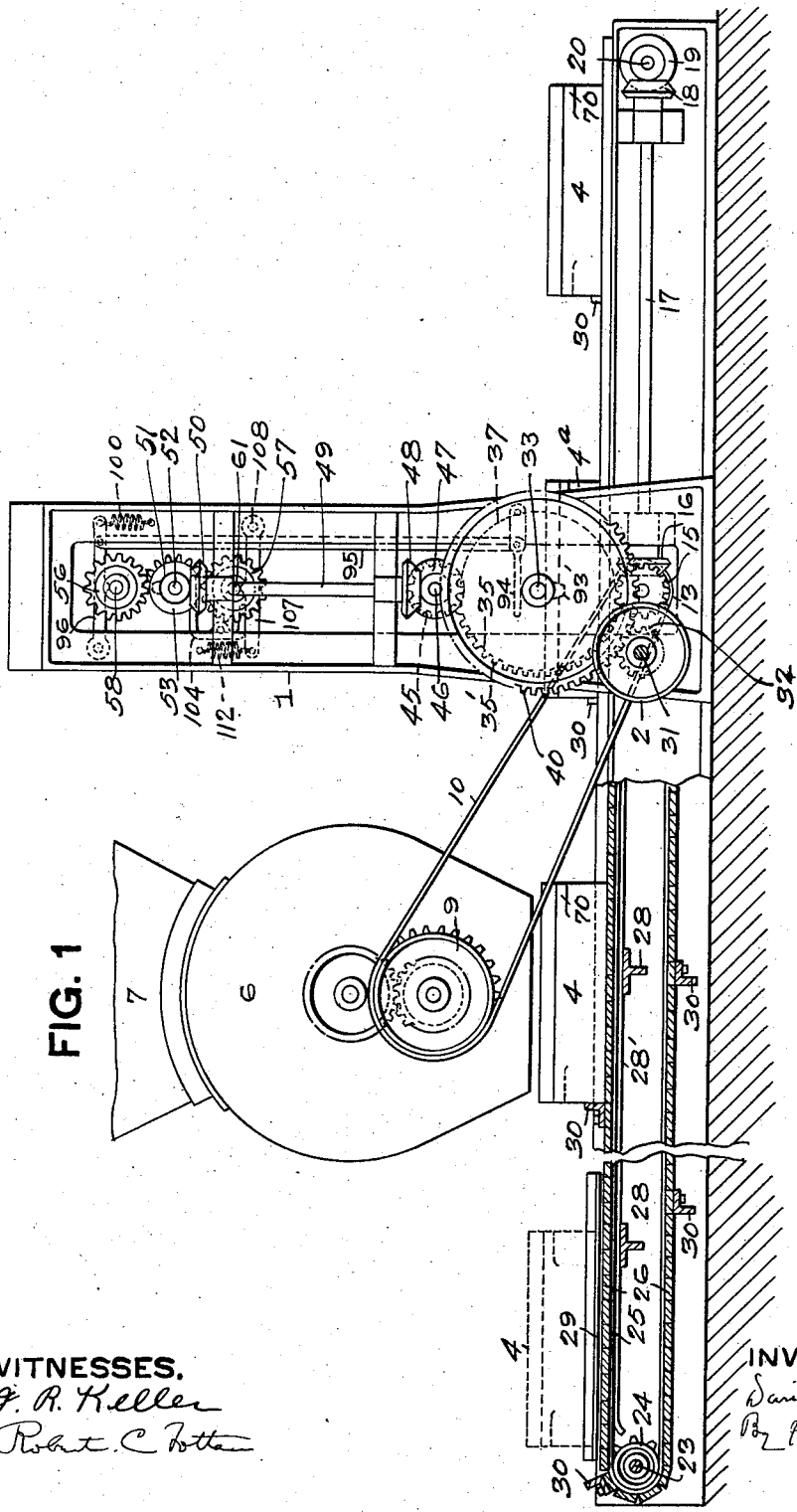

D. M. FAHNESTOCK.
MOLDING APPARATUS.
APPLICATION FILED MAY 25, 1911.

1,027,192.

Patented May 21, 1912.
4 SHEETS—SHEET 1.

WITNESSES.

INVENTOR.

D. M. FAHNESTOCK.
MOLDING APPARATUS.
APPLICATION FILED MAY 25, 1911.

1,027,192.

Patented May 21, 1912.
4 SHEETS—SHEET 2.

WITNESSES.

INVENTOR.

D. M. FAHNESTOCK.
MOLDING APPARATUS.
APPLICATION FILED MAY 25, 1911.
1,027,192.
Patented May 21, 1912.
4 SHEETS—SHEET 3.
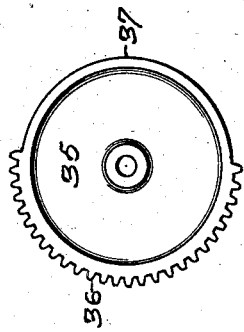
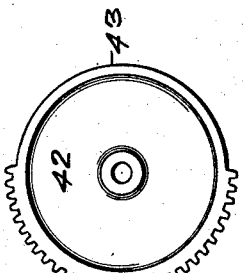
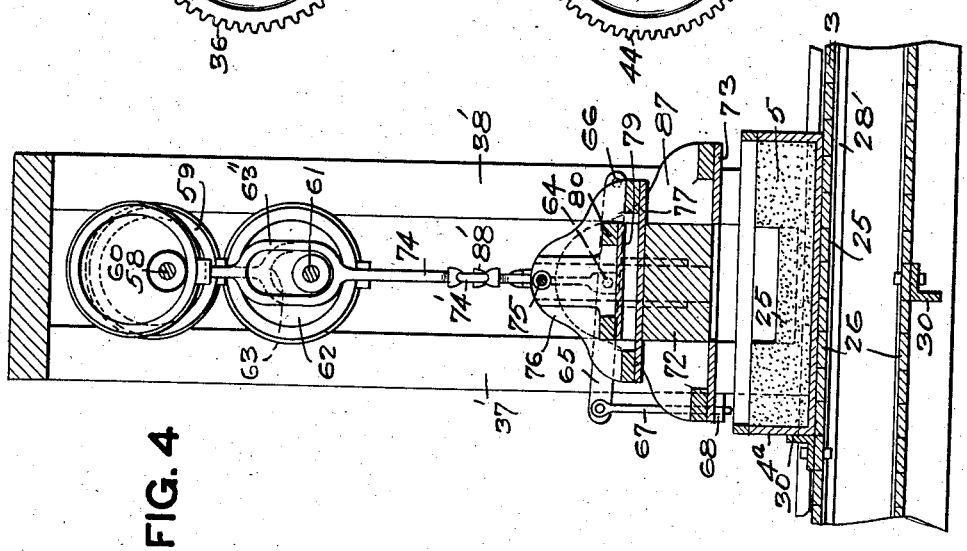
WITNESSES.
INVENTOR.

D. M. FAHNESTOCK.
MOLDING APPARATUS.
APPLICATION FILED MAY 25, 1911.
1,027,192.
Patented May 21, 1912.
4 SHEETS—SHEET 4.
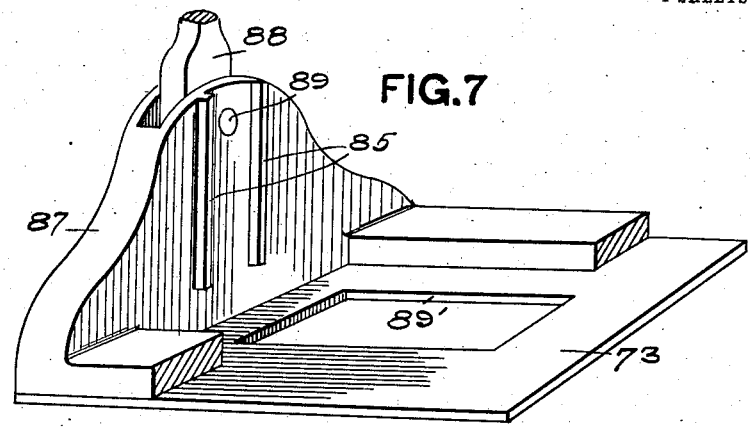
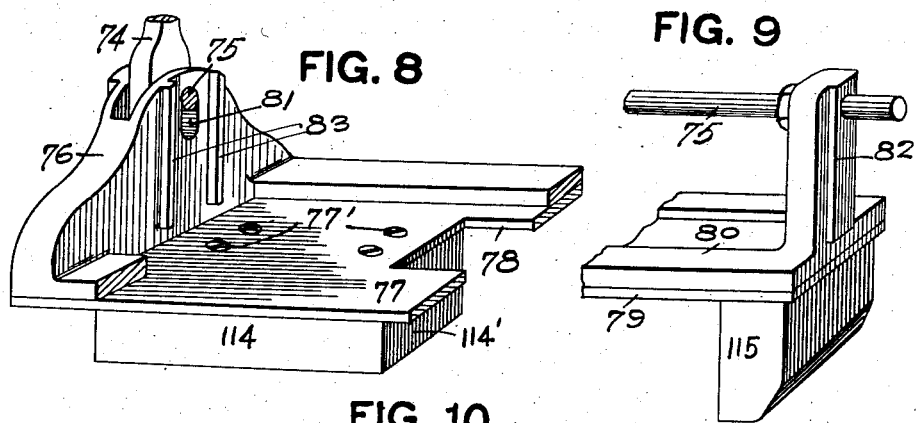
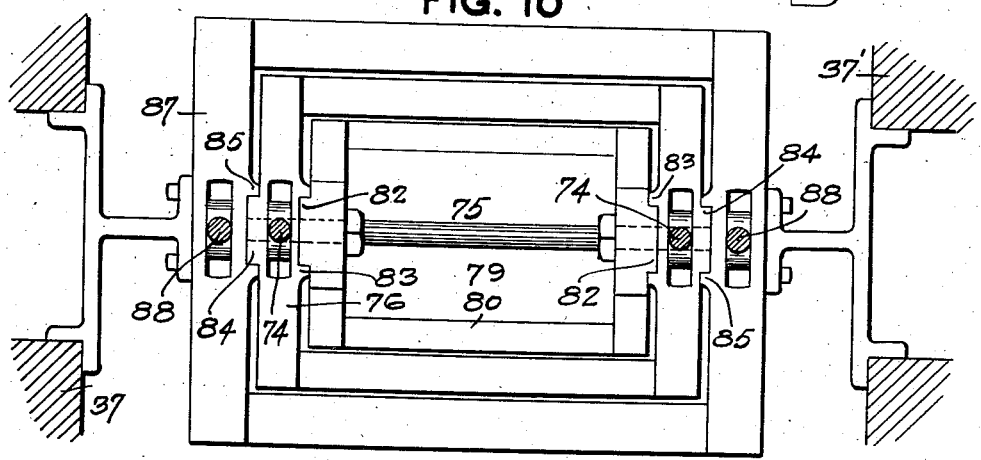
WITNESSES.
INVENTOR.

UNITED STATES PATENT OFFICE.

DAVID M. FAHNESTOCK, OF PITTSBURGH, PENNSYLVANIA.

MOLDING APPARATUS.

1,027,192.  Specification of Letters Patent.  Patented May 21, 1912.

Original application filed February 25, 1911, Serial No. 610,857. Divided and this application filed May 25, 1911. Serial No. 629,366.

*To all whom it may concern:*

Be it known that I, DAVID M. FAHNE-STOCK, a citizen of the United States, and resident of Pittsburgh, in the county of Allegheny and State of Pennsylvania, have invented a new and useful Improvement in Molding Apparatus; and I do hereby declare the following to be a full, clear, and exact description thereof.

My invention relates to molding apparatus. Its object is to provide an improved apparatus by which a pattern, preferably of peculiar construction, is forced into the molding material within a flask, and the molding material then firmly and evenly compacted about the pattern, so as to provide a perfect mold having a hard and tough surface, and one which is adapted efficiently to produce large and intricate castings, and especially steel castings.

A further object is to provide a mold forming apparatus adequate to and suitable for the practice of the general method of making molds described in my application for Letters Patent, Serial No. 610,858, filed Feb. 25, 1911. The apparatus described and claimed hereinafter also is shown and described in another application for Letters Patent, Serial No. 610,857, filed Feb. 25, 1911, it forming a part of the complete apparatus or plant therein described, and the present application being a division of said application Serial No. 610,857.

My present invention contemplates generally the provision of a sectional pattern, pattern inserting apparatus coöperating therewith for forcing the parts of said pattern successively into final mold-forming position, and withdrawing them successively therefrom.

It also contemplates the provision of a presser plate conforming to the contour of the pattern and means for forcing said plate along the pattern into the molding material when the pattern is inserted in the flask.

My invention also consists generally in the improved mechanism for successively actuating and controlling the pattern inserting and the sand pressing means employed, and further in improved means for conveying a flask to pattern-receiving position, fastening it therein, and conveying it therefrom, the said means comprising preferably pins carried by the molding apparatus and preferably controlled by eccentrics carried on a shaft actuated when the motion of the conveyer is stopped, the said shaft also carrying eccentrics having rods carrying the pattern.

My invention also consists in the particular novel combinations of parts and arrangements of apparatus as described more fully hereinafter and fairly included within the scope of the appended claims.

Figure 2:
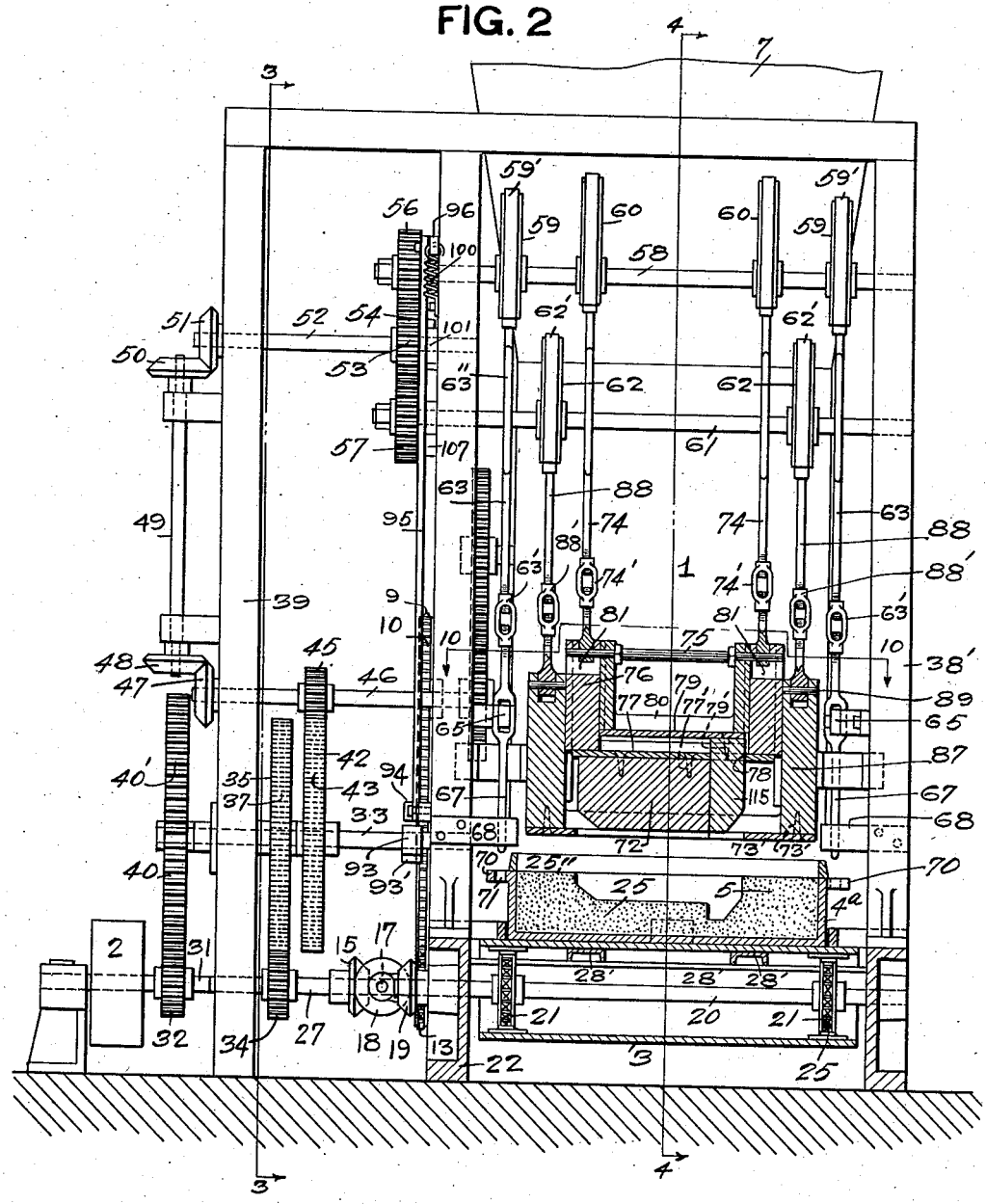

In the accompanying drawings Figure 1 is a side elevation partly in vertical section illustrating one form of apparatus embodying my present invention as included with and driven by the complete molding apparatus of my invention as described more fully and claimed in the aforesaid application Serial No. 610,857. Fig. 2 is a transverse elevation partly in vertical section through the mold-forming apparatus shown in Fig. 1. Fig. 3 is a vertical longitudinal section of the same on the lines 3—3 Fig. 2. Fig. 4 is a vertical longitudinal section of the same on the line 4—4 Fig. 2. Figs. 5 and 6 are detail side views illustrating the main driving gear wheels employed, as hereinafter designated. Fig. 7 is a detail perspective view partly in section of the pressing plate and cross head carrying the same. Fig. 8 is a like view of a section of a pattern and its carrying cross head. Fig. 9 is a like detail fragmentary view illustrating another movable section of the pattern. Fig. 10 is a horizontal section in the line 10—10 Fig. 2.

As indicated in Figs. 1 and 2 the molding apparatus 1 is preferably driven from a suitable source of power such as the belt wheel 2, which also actuates the endless conveyer 3 on which the flasks 4 are carried, the particular flask 4ª carried by the conveyer 3 being shown fastened and supported in mold-receiving position.

As the molding material 5 is inserted within each flask 4 before the mold-forming apparatus 1 forms a mold therein, I have illustrated diagrammatically the sand pouring device 6 as arranged to insert the molding material within each flask before the mold-forming operation proper. The sand pouring device 6 is provided with a suitable hopper 7 and with pouring means (not illustrated) suitably actuated as by a sprocket wheel 9 and chain 10 from the sprocket wheel 13, driven by the same countershaft 27 as that which actuates through the bevel gears 15, 16, longitudinal shaft 17 and bevel gears 18, 19, the transverse shaft 20 carrying the sprocket wheels 21. The transverse shaft 20 is shown as journaled in one end of a suitable bed frame 22, in the other end of which the transverse shaft 23 carrying the sprocket wheels 24 is journaled. The endless sprocket chains 25 are carried by the wheels 21 and 24 and form the essential part of the conveyer 3, which is illustrated as provided with transverse supports or pallets 26, each carried on opposite links of the chains 25 and forming the support for the flasks 4. The conveyer 3 may be further supported by the cross members 28 and longitudinal sills 28' beneath the pallets 26. The flasks are preferably inserted on the conveyer 3 by placing them on a table 29 from which they are removed by cleats or lugs 30 fastened at suitable intervals to the endless conveyer 3. It will be understood, however, that the particular construction of conveyer and the means for inserting the molding material form no part of my present invention, and are described herein with enough particularity only to make clear the operation of the improved molding apparatus of my invention, which I have embodied preferably with the driving mechanism and connections by which the conveyer is actuated, the said molding apparatus including also preferably the fastening means by which each flask is held in proper position upon the conveyer supporting the same to receive the pattern. The said driving connections comprise preferably the short driving shaft 31 driven through the belt wheel 2 and provided with a gear wheel 32 in mesh with the gear wheel 40 having a continuous set of gear teeth 40'. The gear wheel 40 is carried on a secondary driving shaft 33 journaled suitably in the frame 39 of the mold forming machine 1, and carrying also the gear wheels 35 and 42. The gear wheel 35 has a set of gear teeth 36 and a delay face 37, the gear teeth 36 being arranged to intermesh with the teeth of the gear wheel 34 carried on the countershaft 27. The gear wheel 42 has a set of gear teeth 44 and a delay face 43, the gear teeth 44 being arranged to mesh with the teeth of the gear wheel 45 carried on the countershaft 46.

The delay faces 37 and 43 of the gear wheels 35 and 42 are so arranged, and the number of the gear teeth 36 and 44, respectively, are so regulated that during the continuous actuation of the belt wheel 2 and consequent continuous rotation of the shaft 33, while the gear teeth 44 are in mesh with the gear wheel 45, the delay face 37 of the wheel 36 is passing idly by the teeth of the gear wheel 34. Therefore the countershaft 27 driving the conveyer 2 through the bevel gears 15, 16, and their connections, and also driving the sand pouring device 6 through the sprocket wheel 13 and chain 10, is actuated while the shaft 46 driving the mold forming apparatus, as hereinafter described, is at rest.

The shaft 46 drives, through the bevel gears 47, 48, the vertical shaft 49 and bevel gears 50, 51, the horizontal shaft 52 carrying the gear wheel 53. This gear wheel 53 is provided with the gear teeth 54 and delay face 55, and directly actuates and coöperates in the control of the pattern moving and sand pressing mechanism, as hereinafter set forth. The relative number of gear teeth on the wheel 53 and length of its delay face 55, as well as the relative number of gear teeth and length of delay faces on the wheels 35, 42, are so adjusted in connection with the connecting gearing, that the entire pattern inserting and mold pressing operation, including the withdrawal of the pattern and of the pressing device is completed by the time that the gear wheel 42 has rotated sufficiently to bring the delay face 43 again opposite to the adjacent teeth of the gear wheel 45, the delay face 37 of the gear wheel 35 having then passed completely by the gear wheel 34 and the teeth 36 being again intermeshed with the gear wheel 34 to resume the driving of the shaft 27, and therefore of the conveyer 3, and remove the flask from the position 4ᵃ.

The gear wheel or pinion 53 which directly actuates the pattern carrying and mold pressing apparatus proper, has the gear teeth 54 arranged to mesh with the gear teeth of the gear wheels 56 and 57, respectively, and the delay face 55 arranged to pass by said gear wheels idly when one of the gear teeth 54 is in mesh with the gear teeth of the other of said wheels. The gear wheel 56 is keyed or otherwise fastened to the shaft 58, on which are mounted the two sets of eccentrics 59 and 60. The gear wheel 57 is likewise fastened to the shaft 61 on which are mounted the eccentrics 62. The straps 59' of the eccentrics 59 are attached to the connecting rods 63 each preferably provided with suitable turnbuckles 63' and with bifurcated portions 63" which straddle the shaft 61 as illustrated in Fig. 4. Each connecting rod 63 is pivotally joined by a wrist pin 64 to one of the levers 65 each pivoted at 66 to one of the opposite upright members 38' of the machine frame 39, as illustrated in Figs. 2 and 4. Each lever 65 pivotally carries a vertically mounted fastening pin 67 which plays reciprocally within one of the slotted guides 68 attached to diagonally opposite members 37, 37' of the machine frame. The flasks 4 are each provided with ears 70 arranged preferably near diagonally opposite corners of the flasks and having slots 71 through which the pins 67 are forced by the downward throw of the eccentrics 59. By this means each flask 4 is arrested and fastened in exact registering position beneath the suspended pattern illustrated at 72 and suspended presser plate 73, as the gear teeth 44 of the gear wheel 42 are arranged to actuate the gear wheel 45 and the gear pinion 53 driven thereby preferably just before the delay face 37 of the driving gear 35 has arrived opposite the gear wheel 34, so that the throw of the eccentrics 59 will bring the fastening pins 67 into engagement with the slots 71 just as the said slots arrive beneath the said pins and thereby temporarily fasten the flask 4 in the desired position 4ª. The eccentrics 60, which are carried by the same shaft 58 as the eccentrics 59 above described, are retarded somewhat in throw as compared to the eccentrics 59, so that their connecting rods 74 will not be lowered until the flask 4 is pinned in proper position by the registering pins 67.

Each of the rods 74 is preferably provided with a suitable turnbuckle 74' for the purpose of adjusting the distance of insertion of the pattern 72 within the molding material 5. The rods 74 carry the wrist pin 75 which supports and actuates the cross head frame 76 having the pattern plate 77 to which is removably attached, as by the set screws 77', the pattern 72 employed. The downward travel of the rod 74 therefore forces the pattern 72 into the molding material 5, and compacts the molding material below and against the pattern 72.

The pattern 72 is preferably formed in sections, in order to improve the character of the mold where it is irregular in contour, two such sections 114, 115, being illustrated. The projecting portion 115 of the simple pattern shown is reciprocally movable through the aperture 78, in the pattern plate 77 and fits against the mating face 114' of the main portion 114 of the pattern. The projecting portion 115 is attached, as by the screws 79', to the secondary pattern plate 79 carried by the secondary cross head 80 in which is journaled the wrist pin 75, as illustrated in Figs. 2, 8 and 9. The wrist pin 75 is reciprocally movable within the slot 81 of the cross head 76, and the cross head 80 is provided with the tongues 82 which are reciprocally movable within the guides 83 arranged in pairs within the opposite side portions of the cross head frame 76. The cross head frame 76 is likewise provided with interiorly positioned tongues 84 which are reciprocally movable within the pairs of guides 85 arranged vertically on the inside of the cross head 87 carrying the presser plate 73, as will be described more fully below.

During the downward travel of the rods 74 the cross head frame 76 is suspended from the wrist pin 75 which bears against the top portion of the slots 81, so that the secondary mold carrying cross head 80 and projecting portion 115 of the pattern are held in upwardly retracted position until the main portion 114 of the pattern has entered the molding material 5 within the flask 4. As the motion of the main portion 114 of the pattern is resisted by the molding material 5, the wrist pin 75 passes to the bottom of the slots 81, carrying with it the secondary cross head 80 and secondary portion 72' of the pattern. This portion 115 is thereby forced into the molding material until the secondary pattern plate 79 strikes the main pattern plate 77 or until the wrist pin 75 strikes the lower portions of the slots 81, thereby completing the mold within the molding material 5. As soon as the above indicated movement is finished, the gear teeth 54 of the wheel 53 leave the intermeshing teeth of the gear wheel 56. A cam 93 is mounted on the shaft 33 and provided with a projecting portion 93', which had previously engaged by its projecting portion 93' the lever 94, thus raising by the link 95 the lever 96 provided with the dog 97 adapted to engage the slot 98 on the hub 99 of the wheel 56, releasing the lever 94 and allowing the dog 97 to reëngage the slot 98 under the influence of the spring 100 and fix the gear wheel 56 in stationary position. The complete pattern 72 is therefore held in projected position within the molding material 5. A slight further rotation of the gear pinion 53 brings the projecting portion 101' of the cam 101 carried on the shaft 52 into engagement with the arm 103 of the lever 104, pivoted at 105 to the member 37 of the frame and having a finger 106 engaging with the lever 107 pivoted at 108 to the opposite member 37 of the frame and provided with the dog 109 in engagement with the slot 110 in the hub 111 of the gear wheel 57. The dog 109 is thereby retracted from engagement with the slot 110 against the tension of the spring 112, and as the gear teeth 54 come into mesh with the teeth of the gear 57, the shaft 61 is rotated. The rods 88 connected to the strap 62' of the eccentric 62 are thereby lowered, carrying with them the cross head frame 87 to which they are pivotally connected by the wrist pins 89. Each rod 88 is also preferably provided with the turnbuckle 88' for the purpose of adjusting the travel of the presser plate 73 carried by the cross head 87 into the molding material 5. The said presser plate 73 has the slot 89' conforming to the contour of the pattern 72. The presser plate 73 is preferably formed of metal and removably supported upon the cross head frame 87, as by the screws 73' so that whenever the pattern, as 72, employed is removed from the cross head 76 and a new one substituted, the presser plate 73 may be changed so as to conform in contour as closely as possible to the contour in horizontal section of the new pattern used.

The presser plate 73 is forced by the eccentrics 62 and rods 88 against the exposed upper surface 25'' of the molding material and its downward motion continued sufficiently to effectively compact the same about the pattern 72. By my present invention I therefore provide means for inserting a pattern the desired distance within each of the flasks as it is moved into position by the conveyer and also for pressing the molding material about the pattern by a presser plate, as 73, conforming in contour thereto, and passing along the pattern against the exposed surface of the molding material, thereby firmly compacting the said molding material about the pattern after the insertion of the pattern is completed.

In the apparatus shown, I arrange the gear teeth 54 on the gear wheel 53 so that they will reëngage the gear wheel 56 as soon as the downward pressing of the molding material by the plate 73 is completed, the cam 101 having released the lever 104 so that the dog 109 holds the gear wheel 57 in fixed position, and therefore the cross head 87 and pressing plate 73 in downwardly extended position. The reëngagement of the revolving teeth 54 with the gear wheel 56 has the effect of rotating the shaft 58 and withdrawing both the fastening pin 67 and the pattern 72 from the flask 4 by the upward throw of the eccentrics 59 and 60 respectively. In the form of apparatus illustrated the connecting rod 74 first raises the wrist pin 75 within the slots 81 of the cross head frame 76 before the abutting of said wrist pin 75 against the upper portion of said slots 81 results in the raising of the cross head frame 76. The projecting section 115 of the pattern is thereby first retracted and then the section 114 and the entire pattern 72 in the further upward motion of the rods 74. By thus first retracting the more projecting sections or portions and then the portions less projecting, I provide for the maintaining of perfect ledges or corners in the mold, having clean edges, as the initial movement of one pattern section along another aids in maintaining the sand in desired form. This upward motion having been finished, the delay face 55 of the pinion 53 again arrives at the gear teeth of the wheel 56 and the gearing 54 again intermeshes with the gear wheel 57 so as to rotate the shaft 61 and thereby withdraw upwardly the rods 88 through the action of the eccentric 62. The presser plate 73 is thereby carried upwardly by the cross head 87 until the upward motion of the rods is arrested by the delay face 55 of the pinion 53 and the reëngagement of the dog 109 with the slot 110 of the gear wheel 57.

The above described mold forming operations are all performed in this apparatus while the gear teeth 44 on the large gear wheel 42 are rotating the small gear wheel 45. The last of the spur gears 44 of determined number having passed the gear wheel 45, the delay face 43 then rotates idly past the said wheel 45 while the spur gears 36, having reëngaged the gear wheel 34, rotate the shaft 27 and thereby remove the flask in which the mold has just been formed from the position 4ª and carry the succeeding flask containing molding material into such position.

The operation of the mold forming apparatus above described is complete and automatic, whether or not the flasks containing molding material are placed on the support (in this case conveyer) beneath the molding apparatus by hand, or by the action of the conveyer illustrated. Moreover, it will be well understood by persons skilled in the art that a suitable delivery table or delivering conveyer may be employed, if desired, to receive and carry away the flasks containing the finished molds, and indeed the empty flasks may be furnished to the conveyer 3 by any desired mechanical means, if found preferable.

The term "flask" as used in the accompanying claims is intended to cover any receptacle for receiving and carrying the molds.

What I claim is:

1. In molding apparatus, the combination with a pattern comprising a plurality of mutually fitting and reciprocally movable sections, of a cross head carrying each of said sections, the cross head of one section being provided with a slot, a wrist pin journaled in the cross head of another section and reciprocally movable within said slot, connecting rods carrying said wrist pins, and means for actuating said connecting rods.

2. In molding apparatus, the combination with a pattern comprising a plurality of sections, of cross head frames carrying said sections respectively and arranged one within the other, one of said cross head frames being provided with guides and the other with tongues reciprocally movable within said guides, one of said frames having a slot, a pin movable within said slot and journaled in another of said cross head frames, rods carrying said pins, and mechanism for lowering said rods and forcing said cross head frames and pattern sections successively into mold forming position.

3. In molding apparatus, the combination with a pattern, a cross head reciprocally carrying the same and arranged to insert the same in a flask, a connecting rod adapted to actuate said cross head, and an eccentric controlling said connecting rod, of a presser plate, a cross head carrying the same and reciprocally movable relative to aforesaid cross head, a connecting rod carrying said cross head and an eccentric controlling the same, and mechanism for successively actuating said eccentrics to insert and withdraw said pattern and presser plate, respectively.

4. In molding apparatus, the combination with a flask of a reciprocally movable pin adapted to engage the same, a reciprocally movable pattern, means for moving said pin and pattern including eccentrics and a shaft carrying the same, a movable presser plate and means for actuating the same including an eccentric, and a shaft carrying the same, and mechanism adapted to alternately actuate said shafts.

5. In molding apparatus, the combination with means for reciprocally moving a pattern into a flask and means for pressing the molding material about said pattern, of gear wheels operatively connected to said means respectively, a gear pinion having a delay face and teeth adapted to mesh with each of said gear wheels, and mechanism adapted to rotate said gear pinion and arrest the motion of the gear wheel disengaged by its gear teeth, substantially as described.

6. In molding apparatus, the combination of a conveyer adapted to carry flasks, a pattern and movable carrying means therefor arranged adjacent to the conveyer, driving connections between the conveyer and a source of power arranged to interrupt the motion of said conveyer when each flask arrives in position adjacent to said pattern, means for fastening the flask in exact pattern-receiving position, and mechanism actuating said fastening means when the motion of said conveyer is interrupted.

7. In molding apparatus, the combination of a conveyer adapted to carry flasks, a pattern and movable carrying means therefor arranged adjacent to the conveyer, driving connections between the conveyer and a source of power arranged to interrupt the motion of said conveyer when each flask arrives in position adjacent to said pattern, means for fastening the flask in exact pattern-receiving position, and mechanism connecting said fastening means and said pattern-carrying means and the source of power and arranged to successively actuate the same when the conveyer is stopped.

8. In molding apparatus, the combination with a flask provided with slots, of pattern-inserting means, movable fastening pins adapted to enter said slots, and mechanism arranged to successively actuate said pins and said pattern-inserting means, substantially as described.

9. In molding apparatus, the combination with a pattern provided with slots, of movable fastening pins adapted to enter said slots, a pattern, a rotatable shaft, eccentrics carried thereby, and provided with rods connected to said pins and said pattern respectively, and mechanism actuating said shaft to insert and withdraw said pins and pattern successively in said flask.

10. In molding apparatus, the combination with a flask adapted to carry molding material, of movable means for fastening said flask in exact position, a pattern, movable means for forcing said pattern into the molding material within the flask, a presser plate, means for forcing said plate into said molding material and mechanism connecting each of aforesaid means to a source of power and arranged to actuate the same successively in the order named.

In testimony whereof, I the said DAVID M. FAHNESTOCK have hereunto set my hand.

DAVID M. FAHNESTOCK.

Witnesses:
ROBERT C. TOTTEN,
JOHN F. WILL.

Copies of this patent may be obtained for five cents each, by addressing the "Commissioner of Patents, Washington, D. C."